United States Patent
Horiike (10) Patent No.: US 7,304,409 B2
(45) Date of Patent: Dec. 4, 2007

(54) DRIVING DEVICE AND LIGHT AMOUNT CONTROLLER

(75) Inventor: Kaori Horiike, Kawasaki (JP)

(73) Assignee: Canon Kabushiki Kaisha (JP)

( * ) Notice: Subject to any disclaimer, the term of this patent is extended or adjusted under 35 U.S.C. 154(b) by 358 days.

(21) Appl. No.: 11/151,376

(22) Filed: Jun. 13, 2005

(65) Prior Publication Data

US 2005/0275295 A1  Dec. 15, 2005

(30) Foreign Application Priority Data

Jun. 14, 2004  (JP) .............................. 2004-175937

(51) Int. Cl.
  *H02K 37/14* (2006.01)
  *H02K 16/00* (2006.01)
(52) U.S. Cl. ..................... 310/112; 310/49 R; 310/114; 310/164; 396/463
(58) Field of Classification Search ............. 310/49 R, 310/112, 114, 164; 396/75, 451, 463, 464
See application file for complete search history.

(56) References Cited

U.S. PATENT DOCUMENTS

| | | | | |
|---|---|---|---|---|
| 2,814,746 A * | 11/1957 | Boerdijk | | 310/164 |
| 3,238,399 A * | 3/1966 | Brandwijk et al. | | 310/46 |
| 4,767,958 A * | 8/1988 | Sasaki | | 310/257 |
| 5,831,356 A * | 11/1998 | Aoshima | | 310/49 R |
| 5,917,257 A * | 6/1999 | Taghezout | | 310/49 R |
| 5,973,425 A * | 10/1999 | Aoshima | | 310/49 R |
| 6,317,562 B1 * | 11/2001 | Aoshima | | 396/72 |
| 6,331,741 B1 * | 12/2001 | Suzuki | | 310/49 R |
| 6,800,969 B2 * | 10/2004 | Ogawa | | 310/49 R |
| 6,979,918 B2 * | 12/2005 | Aoshima et al. | | 310/49 A |
| 7,173,352 B2 * | 2/2007 | Aoshima | | 310/49 R |
| 7,242,123 B2 * | 7/2007 | Miyawaki | | 310/156.32 |
| 2005/0275295 A1* | 12/2005 | Horiike | | 310/49 R |

FOREIGN PATENT DOCUMENTS

| JP | 61-128763 | * | 6/1986 |
|---|---|---|---|
| JP | 03082355 | * | 4/1991 |
| JP | 04190664 | * | 7/1992 |
| JP | 2002-49076 A | | 2/2002 |

* cited by examiner

*Primary Examiner*—Karl Tamai
(74) *Attorney, Agent, or Firm*—Rossi, Kimms & McDowell LLP (57) ABSTRACT

A low-cost, small-sized and high-output driving device which makes it possible to produce two outputs separately and is easy to handle. The driving device has two driving units comprised of a coil, a stator, a magnet, and a rotor. The two driving units are arranged, side by side, along the axis of the driving device. In particular, a portion of the first rotor of one driving unit inserted in an inner periphery of the second coil of the other driving unit and the inner periphery of the second rotor of the other driving unit. The portion of the first rotor is magnetized by the second coil.

5 Claims, 9 Drawing Sheets

DRIVING DEVICE AND LIGHT AMOUNT CONTROLLER

CROSS REFERENCE TO RELATED APPLICATION

This application claims priority from Japanese Patent Application No. 2004-175937 filed Jun. 14, 2004, which is hereby incorporated by reference.

BACKGROUND OF THE INVENTION

1. Field of the Invention

The present invention relates to a driving device and a light amount controller using the driving device.

2. Description of the Related Art

Conventionally, a driving device which is reduced in diameter around the center of a rotation axis and at the same time increased in output has been proposed in Japanese Laid-Open Patent Publication (Kokai) No. 2002-49076.

Figure 10:
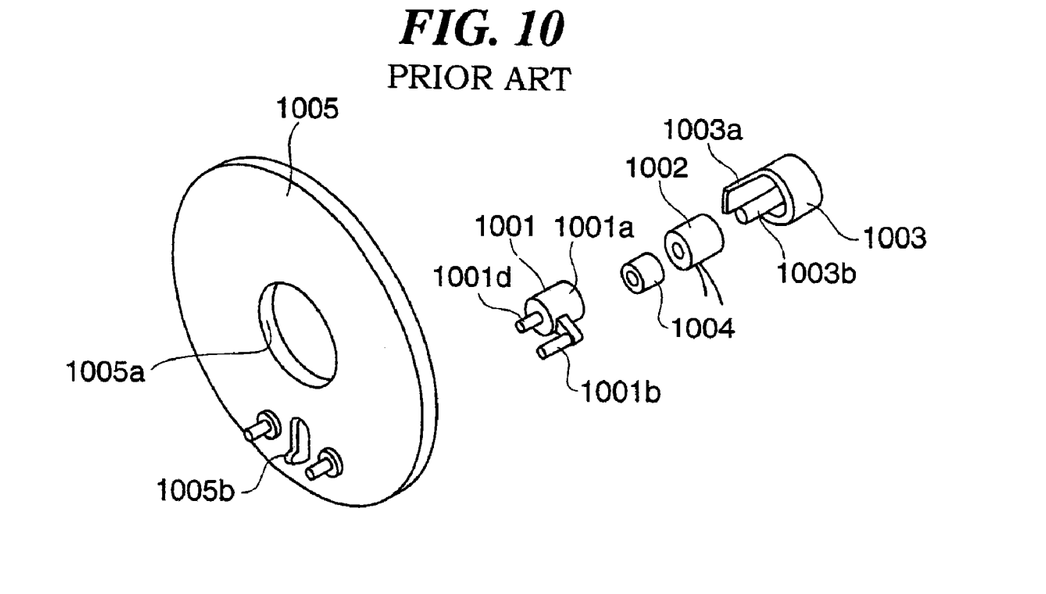
FIG. 10 is an exploded perspective view of a conventional driving device.
Figure 11:
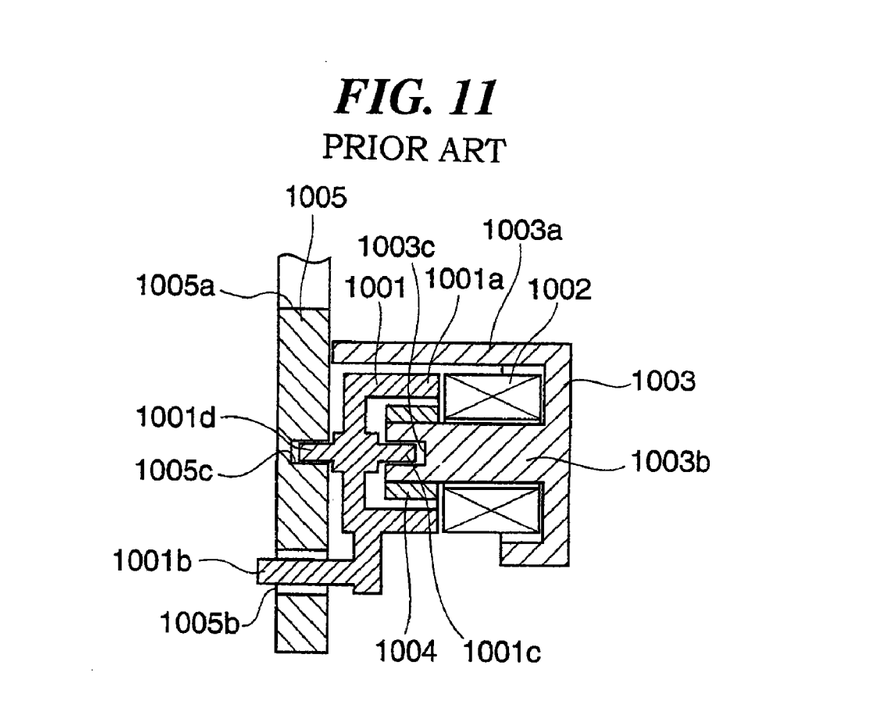
FIG. 11 is an axial cross-sectional view of the driving device in FIG. 10 in an assembled state.

FIG. 10 is an exploded perspective view of the driving device disclosed in the above-mentioned publication, and FIG. 11 is an axial cross-sectional view of the driving device shown in FIG. 1.

In these figures, reference numeral 1001 designates a magnet, 1002 a coil, 1003 a stator, 1004 an auxiliary stator, and 1005 a base plate.

The magnet 1001 is comprised of a bottomed hollow cylindrical magnet body 1001a, a drive pin 1001b formed integrally with the magnet body 1001a in a manner axially protruding from a portion of a peripheral wall of the magnet body 1001a, and shaft parts 1001c and 1001d axially protruding from the opposite sides of the center of the bottom wall of the magnet body 1001a. In the magnet 1001, the peripheral wall of the magnet body 1001a is circumferentially divided into four sections which are magnetized such that they have alternately different S and N poles.

The coil 1002 is formed by winding wire around an annular groove of a cylindrical bobbin. The coil 1002 is disposed within the stator 1003 in a manner extending along the axis of the magnet 1001.

The stator 1003 has a bottomed hollow cylindrical body, which has an outer peripheral wall thereof formed with a protruding piece-like outer magnetic pole part 1003a extending along the axis of the hollow cylindrical body, and a shaft-like protrusion 1003b extending along the axis of the hollow cylindrical body from the center of the inner bottom wall of the hollow cylindrical body. The shaft-like protrusion 1003b has a front end thereof formed therein with a shaft hole 1003c, in which the shaft part 1001c is rotatably fitted. Further, the coil 1002 is rigidly fitted on a base end portion of the shaft-like protrusion 1003b. The stator 1003 is magnetized by the coil 1002.

The auxiliary stator 1004 has a hollow cylindrical shape, and is rigidly fitted on the front end of the shaft-like protrusion 1003b of the stator 1003 in opposed relation to the coil 1002. The auxiliary stator 1004 and the shaft-like protrusion 1003b cooperate to form an inner magnetic pole part.

The base plate 1005 has a circular opening 1005a formed in the center thereof, an arcuate guide slot 1005b formed therein radially outward of the circular opening 1005a, and a shaft hole 1005c formed therein in the vicinity of the arcuate guide slot 1005b. The drive pin 1001b of the magnet 1001 is slidably engaged in the guide slot 1005b of the base plate 1005. Further, the shaft part 1001d of the magnet 1001 is rotatably fitted in the shaft hole 1005c of the base plate 1005.

The outer magnetic pole part 1003a of the stator 1003 is opposed to the outer peripheral surface of the magnet body 1001a with a clearance therebetween, and the outer peripheral surface of the inner magnetic pole part formed by the auxiliary stator 1004 and the shaft-like protrusion 1003b of the stator 1003 is opposed to the inner peripheral surface of the magnet body 1001a with a clearance therebetween.

In the driving device constructed as above, the magnet 1001 is angularly reciprocated about the shaft parts 1001c and 1001d within a limited range by switching the direction of energization of the coil 1002 and thereby changing the polarity of the outer magnetic pole part 1003a and that of the inner magnetic pole part (the protruding part 1003b and the auxiliary stator 1004).

The angular reciprocation of the magnet 1001 is restricted by the guide hole 1005b formed in the base plate 1005 and the drive pin 1001b engaged in the guide hole 1005b.

In the driving device configured as above, magnetic flux generated by energization of the coil 1002 flows from the outer magnetic pole part 1003a to the opposed inner magnetic pole part, or from the inner magnetic pole part to the outer magnetic pole part 1003a opposed thereto, to effectively act on the magnet 1001 located between the outer magnetic pole part 1003a and the inner magnetic pole part.

The distance between the outer magnetic pole part 1003a and the inner magnetic pole part is set to a value obtained by adding together the thickness of the hollow cylindrical magnet body 1001a, the clearance between the magnet body 1001a and the outer magnetic pole part 1003a, and the clearance between the magnet body 1001a and the inner magnetic pole part, i.e. to a minimum possible value, which makes it possible to reduce the resistance of a magnetic circuit formed by the outer magnetic pole part 1003a and the inner magnetic pole part. As the resistance of the magnetic circuit is smaller, a larger amount of magnetic flux can be generated by a small electric current, leading to an increase in the output of the driving device.

In the above driving device disclosed in Japanese Laid-Open Patent Publication (Kokai) No. 2002-49076, the resistance of the magnetic circuit is reduced by setting the distance between the outer magnetic pole part 1003a and the inner magnetic pole part to the minimum possible value as stated above.

However, in the driving device configured as above, the predetermined clearances are provided, respectively, between the magnet body 1001a and the outer magnetic pole part 1003a and between the magnet body 1001a and the inner magnetic pole part, and hence there is room for improvement in terms of reduction of the resistance of the magnet circuit. For example, if one of the clearances can be dispensed with, the distance between the outer magnetic pole part 1003a and the inner magnetic pole part can be shortened, and therefore reduction of the resistance of the magnet circuit can be expected.

Further, in the driving device in which the predetermined clearance is provided between the magnet body 1001a and the opposed inner magnetic pole part, as stated above, it is necessary to control the clearance in course of manufacture, and hence the driving device still remains to be improved in terms of cost reduction as well. If the above-mentioned clearance can be omitted, the clearance control becomes unnecessary, which contributes to reduction of the costs.

Furthermore, according to a light amount controller disclosed in Japanese Laid-Open Patent Publication (Kokai)

No. 2002-49076 referred to above, when it is desired to carry out a plurality of driving operations for driving shutter blades, aperture blades, and the like, it is necessary to provide a number of driving devices corresponding to the number of the driving operations needed on the base plate 1005. For example, most of the existing compact digital cameras have a plurality of driving devices provided on the base plate 1005, and hence the base plate 1005 is almost covered with the driving devices.

SUMMARY OF THE INVENTION

It is an object of the present invention to provide a low-cost, small-sized, and high-output driving device which is capable of producing two outputs separately, and a light amount controller using the driving device.

To attain the above object, in a first aspect of the present invention, there is provided a driving device comprising a hollow cylindrical first magnet having a peripheral wall thereof circumferentially divided into sections magnetized to have alternately different poles, the first magnet having an outer peripheral surface and an inner periphery, a first coil disposed coaxial with and adjacent the first magnet and extending axially of the first magnet, a first stator having a magnetic pole part opposed to the outer peripheral surface of the first magnet, the magnetic pole part of the first stator being magnetized by the first coil, a first rotor rigidly fitted in the inner periphery of the first magnet, the first rotor being magnetized by the first coil, a first output member disposed to be driven to a first position or a second position by rotation of the first magnet, a hollow cylindrical second magnet disposed coaxial with the first magnet and having a peripheral wall thereof circumferentially divided into sections magnetized to have alternately different poles, the second magnet having an outer peripheral surface and an inner periphery, a second coil disposed coaxial with and adjacent the second magnet and extending axially of the second magnet, the second coil having an inner periphery, a second stator having a magnetic pole part opposed to the outer peripheral-surface of the second magnet, the magnetic pole part of the second stator being magnetized by the second coil, a second rotor rigidly fitted in the inner periphery of the second magnet, the second rotor having an inner periphery, and a second output member disposed to be driven to a third position or a fourth position by rotation of the second magnet, wherein the first rotor has a portion thereof inserted in the inner periphery of the second coil and the inner periphery of the second rotor, the portion being magnetized by the second coil.

With the arrangement of the first aspect of the present invention, in each of the two driving units comprised of a coil, a stator, a magnet, and a rotor, the rotor is configured such that a portion thereof rigidly fitted in the inner periphery of the magnet acts as an inner magnetic pole part, whereby the distance between an outer magnetic pole part opposed to the outer periphery of the magnet and the inner magnetic pole part opposed to the inner periphery of the same is reduced.

The driving device according to the first aspect of the present invention is thus constructed by arranging the two driving units in which the resistance of a magnetic circuit is reduced by reducing the distance between the outer magnetic pole part and the inner magnetic pole part, side by side, along the axis of the driving device. As a result, the driving device, which is low in cost, small in size, and high in output, can produce two outputs separately. Moreover, the driving device is easy to handle.

Further, the first rotor operating in a manner interlocked to the first output member is inserted in the inner periphery of the second coil. Therefore, this driving device is capable of causing the first output member and the second output member to produce respective outputs both in a direction from the first magnet to the second magnet, i.e. in the same direction.

Furthermore, the first rotor causes not only a portion thereof rigidly fitted in the inner periphery of the first magnet to act on the first magnet as an inner magnetic pole part, but also a portion thereof inserted in the inner periphery of the second coil to act on the second magnet as an inner magnetic pole part, thereby performing component sharing so as to make the driving device low-cost and easy to assemble, and the magnetic circuit effective.

Preferably, the first rotor and the second rotor are both formed of a soft magnetic material.

Preferably, the driving device comprises a top plate sandwiched between the first coil and the second coil, the top plate having an outer peripheral edge, and the first magnet, the first coil, the second coil, and the second magnet are arranged coaxial with each other in an order mentioned, the first stator comprising at least one protruding piece-like magnetic pole part axially extending from the outer peripheral edge of the top plate toward the first magnet, and the second stator comprising at least one protruding piece-like magnetic pole part axially extending from the outer peripheral edge of the top plate toward the second magnet.

With the arrangement of this preferred arrangement, since the first and second stators are formed integrally with the top plate, as protruding piece-like magnetic pole parts protruding from the top plate respectively, the number of component parts can be reduced. Further, since the magnetic pole parts of the first and second stators are configured to extend from the single top plate in the opposite axial directions, the axial length of the entire driving device can be reduced.

Preferably, the driving device comprises a first top plate covering a surface of the first coil opposite to a surface thereof opposed to the first magnet, the first top plate having an outer peripheral edge, and a second top plate covering a surface of the second coil opposite to a surface thereof opposed to the second magnet, the second top plate having an outer peripheral edge and the first coil, the first magnet, the second magnet, and the second coil are arranged concentric with each other in an order mentioned, the first stator comprising at least one protruding piece-like magnetic pole part axially extending from the outer peripheral edge of the first top plate toward the first magnet, and the second stator comprising at least one protruding piece-like magnetic pole part axially extending from the outer peripheral edge of the second top plate toward the second magnet.

With the arrangement of this preferred arrangement, since the opposite end faces of the driving device are closed by the respective top plates, it is not necessary to use special covers or the like to cover the opposite end faces, which simplifies the construction of the driving device. Further, since a magnetic path for passing magnetic flux generated by the first coil and a magnetic path for passing magnetic flux generated by the second coil are made separate from each other, each flow of magnetic flux effectively acts on the associated magnet without being disturbed. Furthermore, since the first stator and the second stator are independent of each other, it is possible to configure the shape of the outer magnetic pole part as desired. Moreover, it is unnecessary to cover the opposite end faces of the driving device with covers or the like as described above, and hence even if the first stator and the second stator are formed as separate members, demerits caused by an increase in the axial length of the driving device can be suppressed.

To attain the above object, in a second aspect of the present invention, there is provided a light amount controller comprising a base plate having an opening, shutter blades for opening and closing the opening of the base plate, a light amount control member for controlling an amount of light passing through the opening of the base plate, and a driving device held on the base plate, for driving the shutter blades and the light amount control member, and the driving device comprises a hollow cylindrical first magnet having a peripheral wall thereof circumferentially divided into sections magnetized to have alternately different poles, the first magnet having an outer peripheral surface and an inner periphery, a first coil disposed coaxial with and adjacent the first magnet and extending axially of the first magnet, a first stator having a magnetic pole part opposed to the outer peripheral surface of the first magnet, the magnetic pole part of the first stator being magnetized by the first coil, a first rotor rigidly fitted in the inner periphery of the first magnet, the first rotor being magnetized by the first coil, a first output member disposed to be driven to a first position or a second position by rotation of the first magnet, a hollow cylindrical second magnet disposed coaxial with the first magnet and having a peripheral wall thereof circumferentially divided into sections magnetized to have alternately different poles, the second magnet having an outer peripheral surface and an inner periphery, a second coil disposed coaxial with the second magnet and extending axially of the second magnet, the second coil having an inner periphery, a second stator having a magnetic pole part opposed to the outer peripheral surface of the second magnet, the magnetic pole part of the second stator being magnetized by the second coil, a second rotor rigidly fitted in the inner periphery of the second magnet, the second rotor having an inner periphery, and a second output member disposed to be driven to a third position or a fourth position by rotation of the second magnet, the first rotor of the driving device having a portion thereof inserted in the inner periphery of the second coil and the inner periphery of the second rotor, the portion being magnetized by the second coil, the first output member driving the light amount control member, and the second output member driving the shutter blades.

The above and other objects, features, and advantages of the invention will become more apparent from the following detailed description taken in conjunction with the accompany drawings.

DETAILED DESCRIPTION OF THE PREFERRED EMBODIMENTS

The present invention will now be described in detail with reference to the drawings showing embodiments thereof.

First, a driving device according to a first embodiment of the present invention will be described with reference to FIGS. 1 to 7D.

Figure 1:
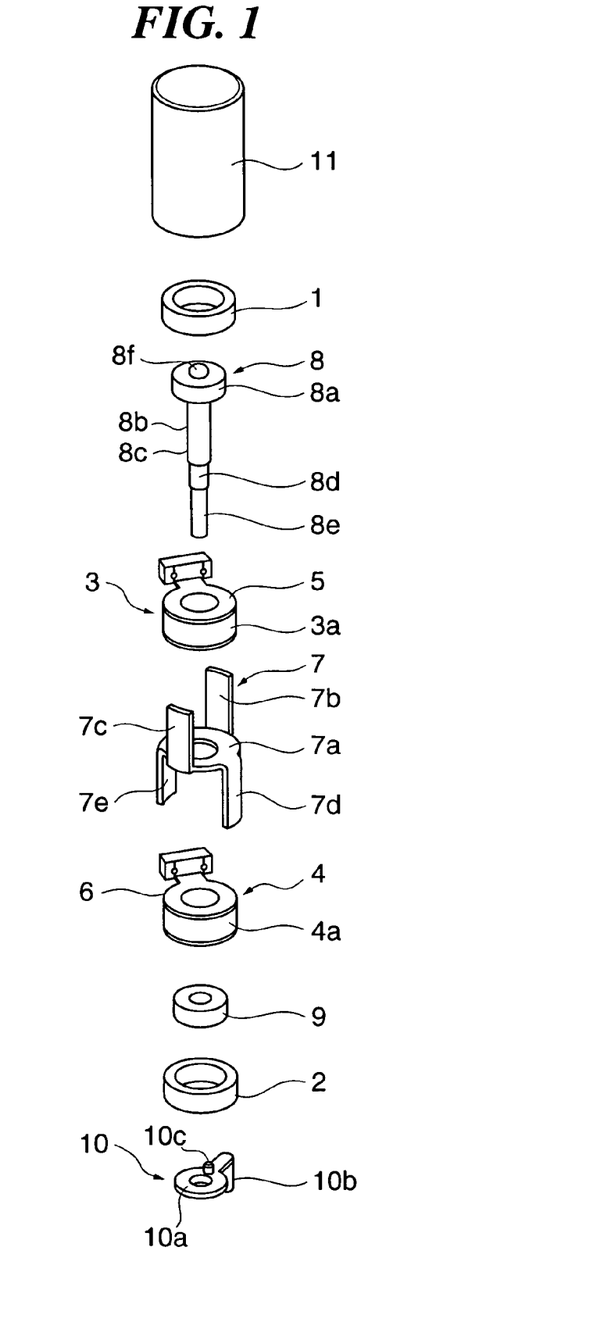
FIG. 1 is an exploded perspective view of a driving device according to a first embodiment of the present invention.
Figure 2:
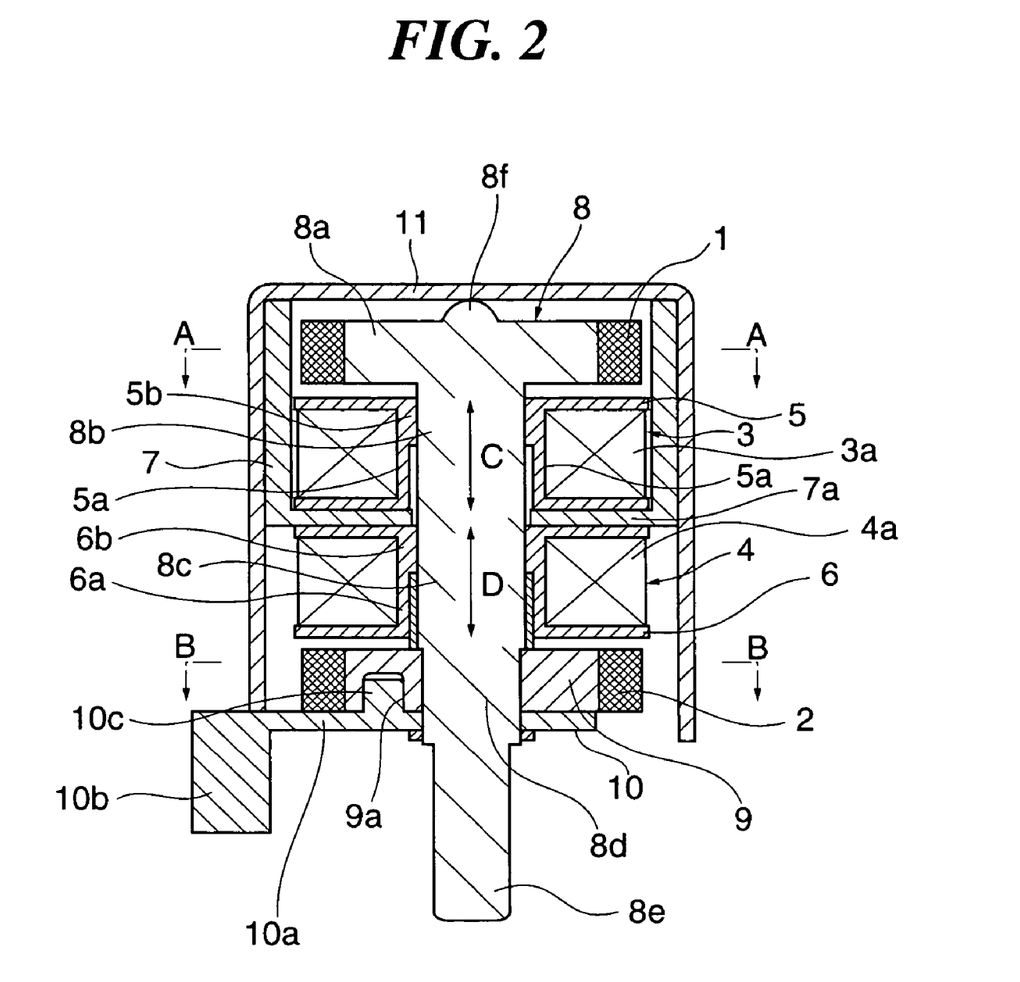
FIG. 2 is an axial cross-sectional view of the driving device in FIG. 1 in an assembled state.
Figure 3A:
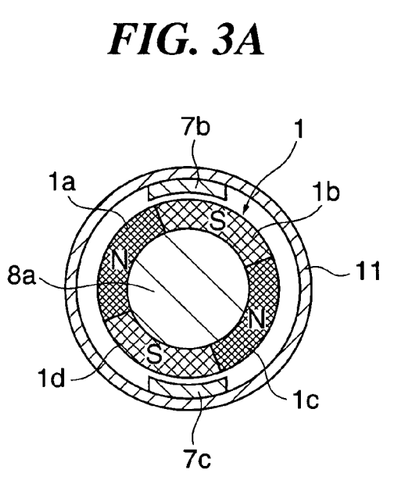
FIG. 3A is a cross-sectional view, taken on line A-A in FIG. 2, of a first magnet appearing in FIG. 1 in a state having been driven to a first position.
Figure 3B:
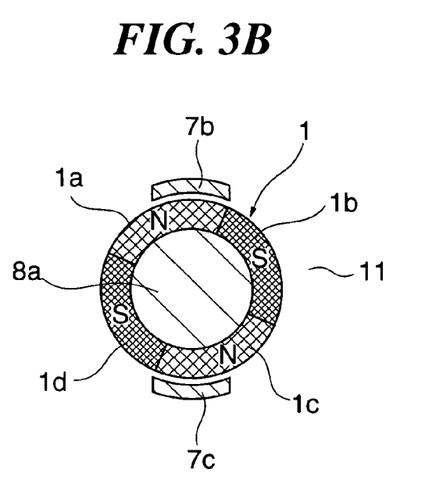
FIG. 3B is a cross-sectional view, taken on line A-A in FIG. 2, of the first magnet in a state having been driven to a second position.

FIG. 1 is an exploded perspective view of the driving device, and FIG. 2 is an axial cross-sectional view of the driving device in FIG. 1 in an assembled state. FIGS. 3A and 3B and 4A and 4B are views useful in explaining angular reciprocation of the driving device through a predetermined rotational angle, in which FIGS. 3A and 3B are cross-sectional views taken on line A-A in FIG. 2, and FIGS. 4A and 4B cross-sectional views taken on line B-B in FIG. 2.

In FIGS. 1 to 4B, reference numeral 1 designates a first magnet in the form of a hollow cylinder having open opposite ends. The first magnet 1 has a peripheral wall thereof circumferentially divided into n sections (four sections in the present embodiment) magnetized such that they have alternately different S and N poles. More specifically, as shown e.g. in FIG. 3A, a first section 1a and a third section 1c are N magnetized, and a second section 1b and a fourth section 1d are S magnetized. Further, the first magnet 1 has an inner periphery thereof rigidly fitted on the outer periphery of a disk-shaped part 8a of a first rotor 8, described in detail hereinafter, such that the first magnet 1 can rotate in unison with the first rotor 8.

Reference numeral 2 designates a second magnet in the form of a hollow cylinder having open opposite ends. The second magnet 2 has a peripheral wall thereof circumferentially divided into n sections (four sections in the present embodiment) magnetized such that they have alternately different S and N poles. More specifically, as shown e.g. in FIG. 4A, a first section 2a and a third section 2c are N magnetized, and a second section 2b and a fourth section 2d are S magnetized. The second magnet 2 has an inner periphery thereof rigidly fitted on the outer periphery of a second rotor 9, described in detail hereinafter, such that the second magnet 2 can rotate in unison with the second rotor 9.

Reference numeral 3 designates a first coil in the form of a hollow cylinder having open opposite ends. The first coil 3 is formed by winding wire 3a around an annular groove 5a of a hollow cylindrical first bobbin 5 formed of an insulating material. The first coil 3 is disposed coaxial with and adjacent the first magnet 1 and extends axially of the first magnet 1 on the second magnet 2 side with respect to the first magnet 1. The outer diameter of the first coil 3 is approximately equal to that of the first magnet 1. The first bobbin 5 has an inner periphery 5b thereof fitted on a base end side cylindrical portion 8b of the first rotor 8 to rotatably support the first rotor 8.

Reference numeral 4 designates a second coil in the form of a hollow cylinder having open opposite ends. The second coil 4 is formed by winding wire 4a around an annular groove 6a of a hollow cylindrical second bobbin 6 formed of an insulating material. The second coil 4 is disposed coaxial with and adjacent the second magnet 2 and extends axially of the second magnet 2 on the first magnet 1 side with respect to the second magnet 2. The outer diameter of the second coil 4 is approximately equal to that of the second magnet 2. The second bobbin 6 has an inner periphery 6b thereof fitted on an intermediate cylindrical portion 8c of the first rotor 8 to rotatably support the first rotor 8.

Reference numeral 7 designates a stator (first and second stators formed integrally with each other) formed of a soft magnetic material. The stator 7 has a ring-shaped top plate 7a, and (n+N)/2 (four in the present embodiment) protruding parts 7b, 7c, 7d and 7e formed integrally with the top plate 7a and axially extending from the outer peripheral edge of the top plate 7a. The first protruding part 7b and the second protruding part 7c are bent through 90 degrees relative to the top plate 7a and extend in one axial direction, while the third protruding part 7d and the fourth protruding part 7e are bent through 90 degrees relative to the top plate 7a and extend in the opposite axial direction. The first protruding part 7b and the second protruding part 7c form first outer magnetic pole parts, and the third protruding part 7d and the fourth protruding part 7e form second outer magnetic pole parts. Thus, the top plate 7a and the first and second protruding parts 7b and 7c constitute a first stator, and the top plate 7a and the third and fourth protruding parts. 7d and 7e constitute a second stator.

The first outer magnetic pole parts 7b and 7c are opposed to the outer peripheral surface of the first magnet 1 with a predetermined clearance therebetween. Further, the first outer magnetic pole parts 7b and 7c are offset from each other by an angle of 720/n degrees (180 degrees in the present embodiment) in the circumferential direction of the top plate 7a. The first outer magnetic pole parts 7b and 7c are magnetized by energization of the first coil 3 to act on the first magnet 1 together with a first inner magnetic pole part, described hereinafter.

The second outer magnetic pole parts 7d and 7e are opposed to the outer peripheral surface of the second magnet 2 with a predetermined clearance therebetween. Further, the second outer magnetic pole parts 7d and 7e are offset from each other by an angle of 720/n degrees (180 degrees in the present embodiment) in the circumferential direction of the top plate 7a.

Since the first outer magnetic pole parts 7b and 7c and the second outer magnetic pole parts 7d and 7e are parts of the same member, it is necessary to form these parts at respective circumferential locations which do not overlap each other, as viewed in the axial direction. The second outer magnetic pole parts 7d and 7e are magnetized by energization of the second coil 4 to act on the second magnet 2 together with a second inner magnetic pole part, described hereinafter.

The first rotor 8 is a rod-like rotor formed of a soft magnetic material. The first rotor 8 has a front end (lower end as viewed in FIGS. 1 and 2) formed as a first output part (first output member) 8e and a base end (upper end as viewed in FIGS. 1 and 2) formed as the disk-shaped part 8a. For example, a light amount control blade 15 (see FIGS. 5B and 6), described in detail hereinafter, is driven by output from the first output part 8e. The disk-shaped part 8a is rigidly fitted in the inner periphery of the first magnet 1, and the first rotor 8 performs angular reciprocation along with reciprocating motion of the first magnet 1 to drive, for example, the light amount control blade 15.

The base end side cylindrical portion 8b (a portion indicated by a double-headed arrow C in FIG. 2) of the first rotor 8 is inserted in the inner periphery of the first coil 3, and when the first coil 3 is energized, the disk-shaped part 8a and the base end side cylindrical portion 8b are magnetized. The disk-shaped part 8a of the first rotor 8 is opposed to the first outer magnetic pole parts 7b and 7c of the stator 7 opposed to the first magnet 1, such that it sandwiches the first magnet 1 between the same and the first outer magnetic pole parts 7b and 7c, and forms the first inner magnetic pole part. The first inner magnetic pole part 8a is magnetized by the first coil 3 such that it has an opposite pole to the pole of the first outer magnetic pole parts 7b and 7c of the stator 7. As a result, a magnetic circuit is formed by the top plate 7a, and the first outer magnetic pole parts 7b and 7c of the stator 7 and the first inner magnetic pole part 8a and the base end side cylindrical portion 8b of the first rotor 8. The distance between the first outer magnetic pole parts 7b and 7c and the first inner magnetic pole part 8a of the first rotor 8 is controlled only by the thickness of the first magnet 1 and a gap between the first magnet 1 and the first outer magnetic pole parts 7b and 7c, which gap is set to a small value that prevents contact between these parts, so that the distance can be set to a required minimum value, which makes it possible to reduce the resistance of the magnetic circuit and cause magnetic flux to effectively act on the first magnet 1 sandwiched between the first outer magnetic pole parts 7b and 7c and the first inner magnetic pole part 8a.

The intermediate cylindrical portion 8c (a portion indicated by a double-headed arrow D in FIG. 2) of the first rotor 8 is inserted in the inner periphery of the second coil 4, and when the second coil 4 is energized, the intermediate cylindrical portion 8c and a front end-side cylindrical portion 8d of the first rotor 8 are magnetized. Further, since the front end-side cylindrical portion 8d is fitted in the second rotor 9, magnetic flux flows through the front end-side cylindrical portion 8d. As a result, the intermediate cylindrical portion 8c, the front end-side cylindrical portion 8d, and the second rotor 9 form the second inner magnetic pole part, and the magnetic flux acts on the second magnet 2. The second inner magnetic pole part (the intermediate cylindrical portion 8c and the front end-side cylindrical portion 8d of the first rotor 8, and the second-rotor 9) is magnetized by the second coil 4 such that it has an opposite pole to the pole of the second outer magnetic pole parts 7d and 7e. As a result, a magnetic circuit is formed by the top plate 7a and the second outer magnetic pole parts 7d and 7e, and the second inner magnetic pole part. The distance between the second outer magnetic pole parts 7d and 7e and the second inner magnetic pole part (second rotor 9) is controlled only by the thickness of the second magnet 2 and a gap between the second magnet 2 and the second outer-magnetic pole parts 7d and 7e, which gap is set to a small value that prevents contact between these parts, so that the distance can be set to a required minimum value, which makes it possible to reduce the resistance of the magnetic circuit and cause magnetic flux to effectively act on the second magnet 2 sandwiched between the second outer magnetic pole parts 7d and 7e and the second inner magnetic pole part. The first rotor 8 is rigidly fitted in the first magnet 1, and functions not only as the first inner magnetic pole part while rotating in unison with the first magnet 1, but also as the second inner magnetic pole part.

A hemispheric protrusion 8f protrudes from the center of the upper surface of the disk-shaped part 8a of the first rotor 8. The protrusion 8f is held in point-contact with the inner surface of the closed end of a cover 11, referred to hereinafter, whereby contact resistance of the cover 11 to the rotation of the first rotor 8 is reduced.

The second rotor 9 is a rod-like rotor formed of a soft magnetic material. The second rotor 9 is rigidly fitted in the inner periphery of the second magnet 2, and performs angular reciprocation along with angular reciprocation of the second magnet 2. Further, the second rotor 9 is rotatably fitted on the front end-side cylindrical portion 8d of the first rotor 8.

Reference numeral 10 designates a second output member e.g. for driving shutter blades 13 and 14 (see FIGS. 5B and 6), referred to hereinafter. The second output member 10 is comprised of a ring-shaped member 10a, an output pin lob axially extending from the outer peripheral edge of the ring-shaped member 10a, an engaging pin 10c axially extending from the upper surface of the ring-shaped member 10a in the opposite direction to the direction in which the output pin 10b extends. The ring-shaped member 10a has a central opening thereof fitted on the first output part 8e of the first rotor 8, and the engaging pin 10c is fitted in an engaging hole 9a in the second rotor 9, whereby the second output member 10 is fixedly attached to the lower surface of the second rotor 9 for angular reciprocation in unison with the second rotor 9 through a predetermined rotational angle.

The second output member 10 may be formed integrally with the second magnet 2 or the second rotor 9.

The cover 11 in the form of an inverted bottomed hollow cylinder covers the entire driving device to prevent an external force from being applied to the rotating magnets 1 and 2 and the magnetic pole parts of the stator 7 to deform these, and dust from entering the driving device.

Next, a description will be given of a light amount controller equipped with the driving device configured as above, according to the present embodiment, with reference to FIGS. 5A to 7D.

Figure 5A:
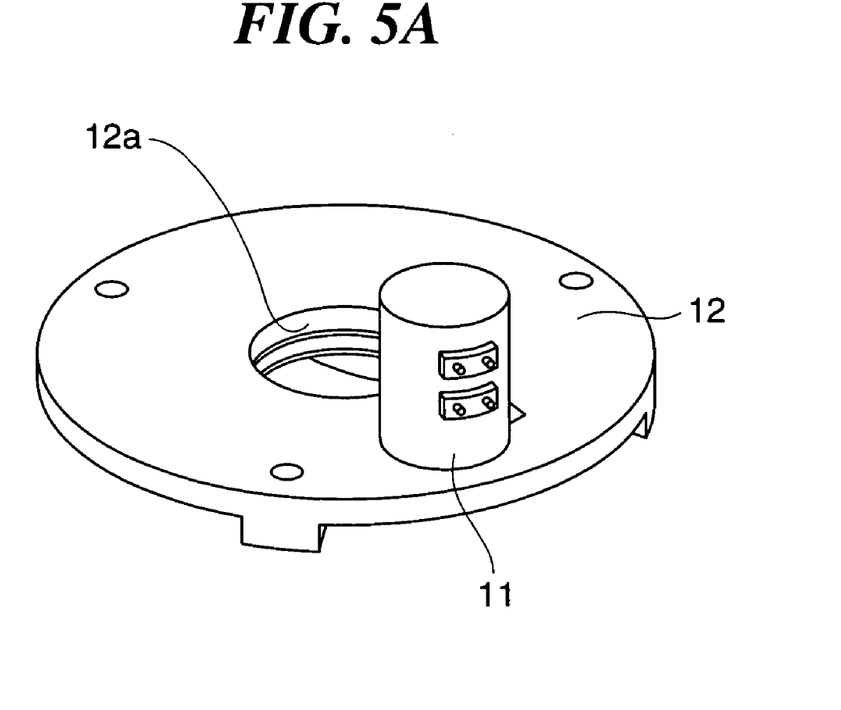
FIG. 5A is a perspective view showing the arrangement of a light amount controller equipped with the driving device according to the first embodiment.
Figure 5B:
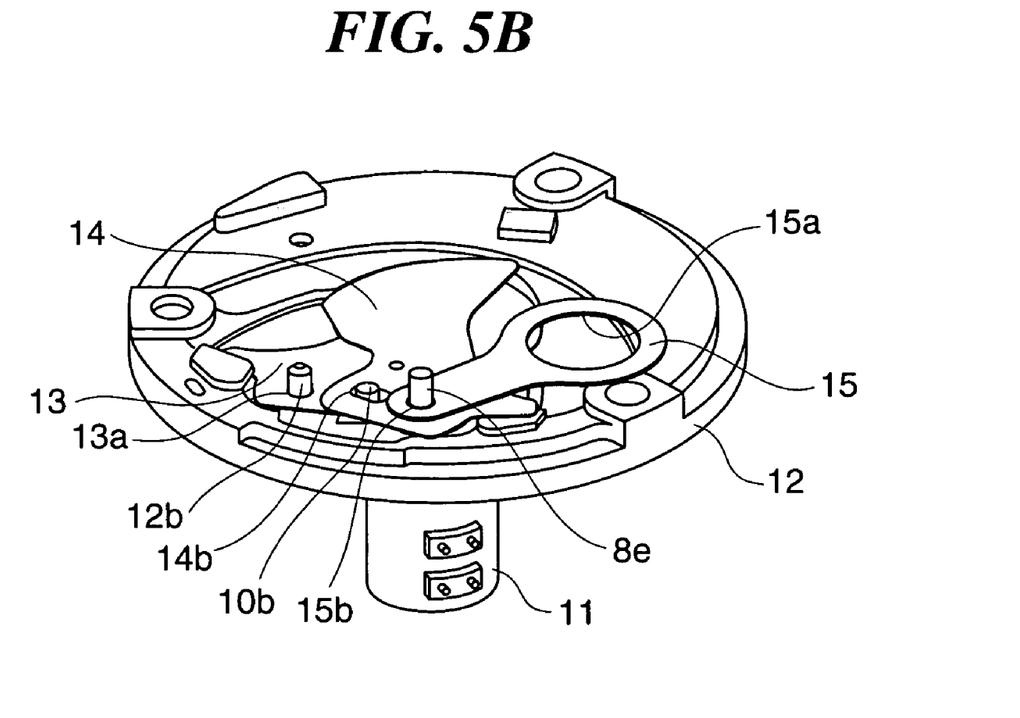
FIG. 5B is a perspective view of the light amount controller as viewed from a shutter blade side.
Figure 6:
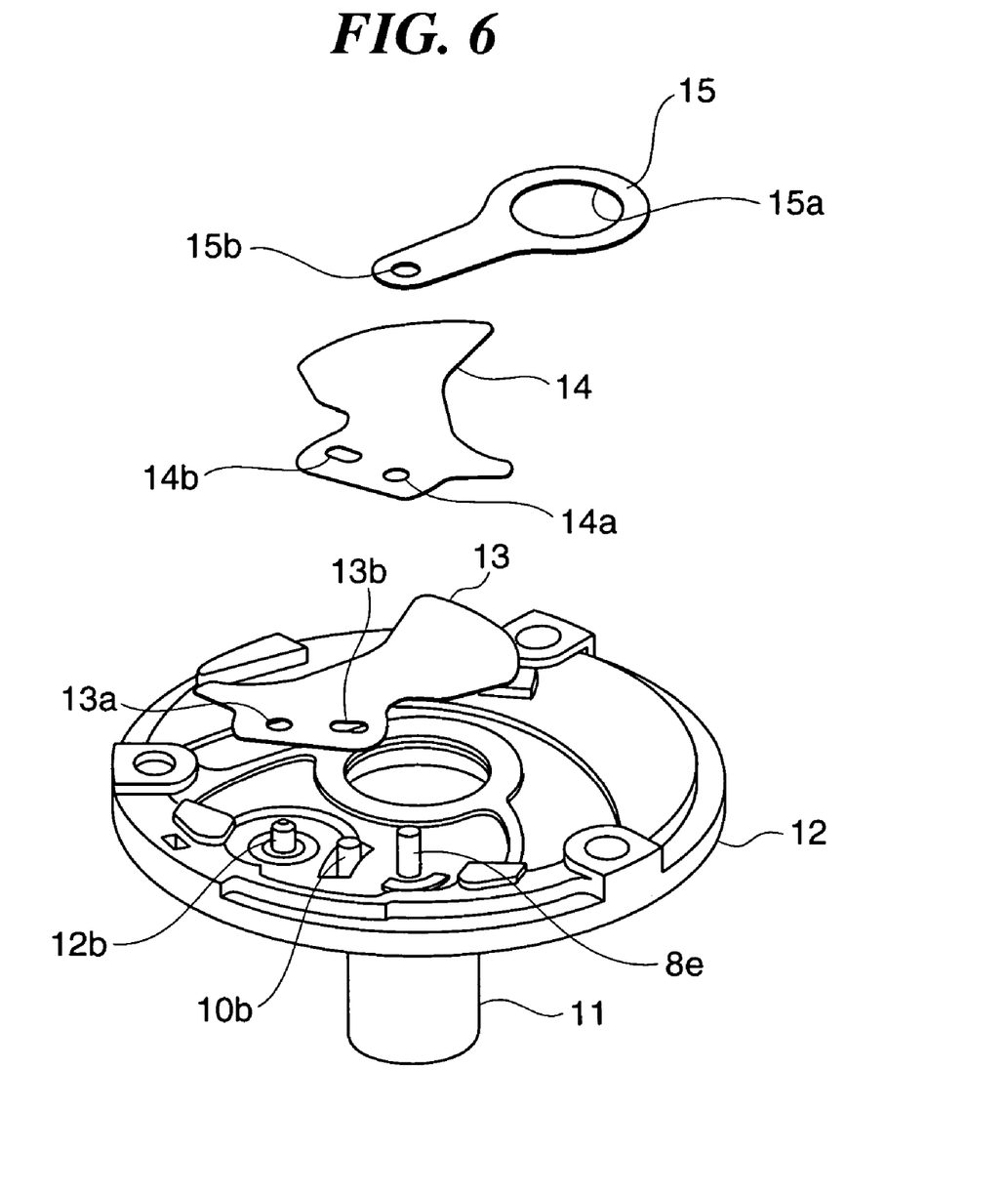
FIG. 6 is an exploded perspective view of the light amount controller having the driving device according to the first embodiment mounted incorporated therein.

FIG. 5A is a perspective view showing the arrangement of the light amount controller equipped with the driving device of the present embodiment, and FIG. 5B is a perspective view of the light amount controller as viewed from the shutter blade side. Further, FIG. 6 is an exploded perspective view of the light amount controller, and FIGS. 7A to 7D are plan views showing driven states of the shutter blades and the light amount control blade.

In FIGS. 5A to 7D, reference numeral 12 designates a disk-shaped base plate. The base plate 12 has an opening 12a formed in its center, and holds the driving device of the present embodiment, the shutter blades 13 and 14, and the light amount control blade 15, referred to hereinafter, and so forth.

The above-described driving device drives the shutter blades 13 and 14 to open and close the opening 12a of the base plate 12, and sets the light amount control blade 15 in the optical path to reduce the amount of light or out of the same.

The two shutter blades 13 and 14 can be driven by the output pin 10b of the second output member 10 between a position for closing the opening 12a of the base plate 12 and a position for opening the opening 12a. More specifically, the output pin 10b is slidably engaged in an arcuate guide slot 13b in the shutter blade 13 and an arcuate guide slot 14b in the shutter blade 14. Further, a shaft hole 13a in the shutter blade 13 is rotatably fitted on a shaft part 12b protruding from the base plate 12, and a shaft hole 14a in the shutter blade 14 is rotatably fitted on the first output part 8e of the first rotor 8. Thus, the shutter blade 13 rotates about the shaft hole 13a, while the shutter blade 14 rotates about the shaft hole 14a.

Figure 7A:
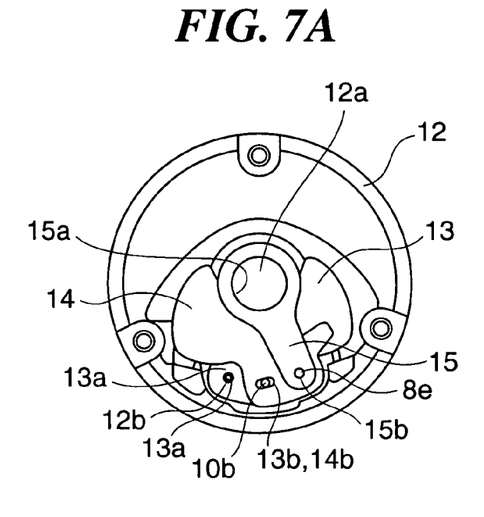
FIGS. 7A to 7D are plan views showing respective driven states of shutter blades and a light amount control blade of the light amount controller shown in FIGS. 5A to 6.
Figure 7B:
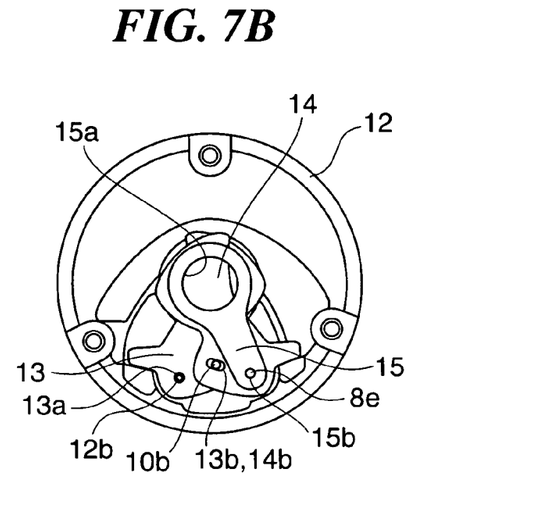
Figure 7C:
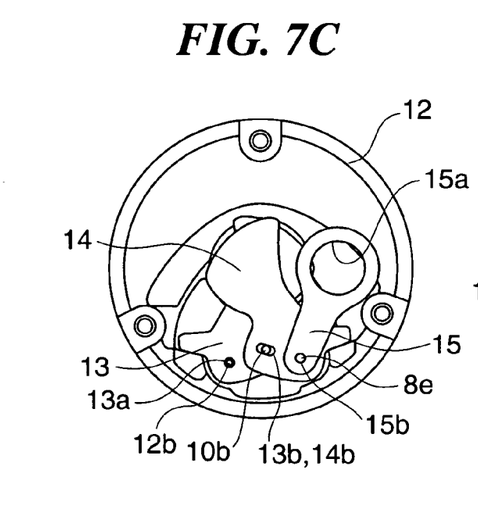
Figure 7D:
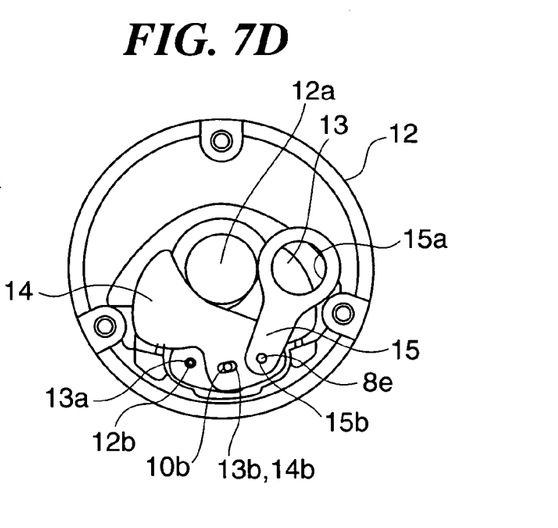

FIGS. 7A and 7D show states in which the shutter blades 13 and 14 have been driven to the respective positions for opening the opening 12a of the base plate 12, and FIGS. 7B and 7C show states in which the shutter blades 13 and 14 have been driven to the respective positions for closing the opening 12a of the base plate 12.

The second magnet 2 can be driven for rotation between two positions by switching the direction of energization of the second coil 4, and in accordance with this rotation, the shutter blade 14 is driven between the positions shown in FIGS. 7A and 7B, respectively.

An operation for driving the second magnet 2 will be described in detail hereinafter.

As shown in FIGS. 5B to 7D, the light amount control blade (light amount control member) 15 has one end thereof formed with an opening 15a smaller in diameter than the opening 12a of the base plate 12. Further, the light amount control blade 15 has the other end thereof formed with a shaft hole 15b rigidly fitted on the first output part 8e of the first rotor 8. The light amount control blade 15 serves as a member for reducing the opening area of the opening 12a of the base plate 12 to thereby limit the amount of exposure, and is brought into an aligned position or a retreated position with respect to the opening 12a according to brightness (exposure amount). The light amount control blade 15 is driven for rotation about the shaft hole 15b by rotation of the first output part 8e of the first rotor 8. The aligned position of the light amount control blade 15 with respect to the opening 12a is shown in FIGS. 7A and 7B, while the retreated position of the light amount control blade 15 with respect to the opening 12a is shown in FIGS. 7C and 7D. The first magnet 1 can be driven for rotation to two positions by switching the direction of energization of the first coil 3, and the light amount control blade 15 is driven in accordance with the rotation of the first magnet 1.

Next, a description will be given of the operation for driving the first magnet 1 between the two positions (first and second positions) by energizing the first coil 3, with reference to FIGS. 3A and 3B.

FIG. 3A is a cross-sectional view, taken on line A-A in FIG. 2, of the first magnet 1 in a state having been driven to the first position (e.g. the state shown in FIG. 7A), and FIG. 3B is a cross-sectional view, taken on line A-A in FIG. 2, of the first magnet 1 in a state having been driven to the second position (e.g. the state shown in FIG. 7C).

When the first outer magnetic pole parts 7b and 7c of the stator 7 are S magnetized and the first inner magnetic pole part 8a of the first rotor 8 is N magnetized, by energizing the first coil 3 in the state shown in FIG. 3A, the first magnet 1 is rotated clockwise to reach the state shown in FIG. 3B, in which the first magnet 1 abuts a stopper, not shown, to stop.

As the first magnet 1 is rotated, the first output part 8e of the first rotor 8 rigidly fitted in the first magnet 1 is rotated along with the first magnet 1, whereby the light amount control blade 15 interlocked to the first rotor 8 is also rotated. In the state shown in FIG. 3B, if the first outer magnetic pole parts 7b and 7c of the stator 7 are N magnetized and the first inner magnetic pole part 8a of the first rotor 8 is S magnetized by energizing the first coil 3 in the opposite direction to that of the above energization in the state shown in FIG. 3A, the first magnet 1 is rotated counterclockwise to reach the state shown in FIG. 3A, in which the first magnet 1 abuts a stopper, not shown, to stop.

As is apparent from the above description, the first magnet 1 can be driven between the first and second positions through a predetermined rotational angle by switching the direction of energization of the first coil 3.

Next, a description will be given of the operation for driving the second magnet 2 between the two positions (third and fourth positions) by energizing the second coil 4, with reference to FIGS. 4A and 4B.

Figure 4A:
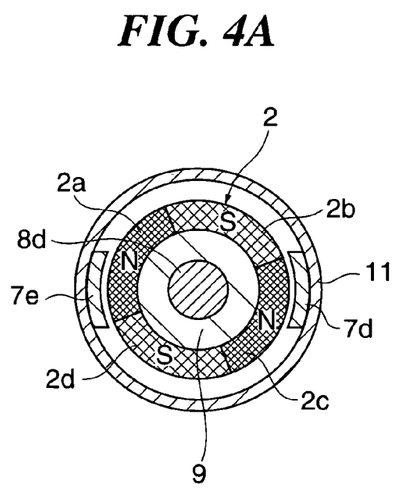
FIG. 4A is a cross-sectional view, taken on line B-B in FIG. 2, of a second magnet appearing in FIG. 1 in a state having been driven to a third position.
Figure 4B:
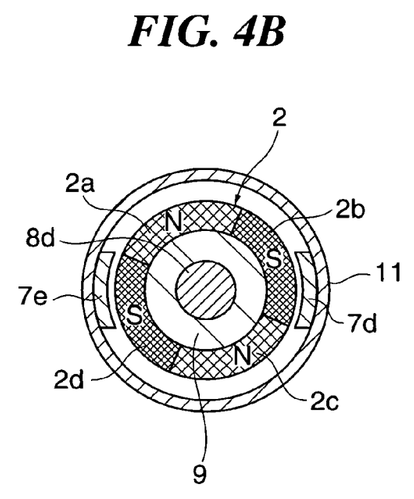
FIG. 4B is a cross-sectional view, taken on line B-B in FIG. 2, of the second magnet in a state having been driven to a fourth position.

FIG. 4A is a cross-sectional view, taken on line B-B in FIG. 2, of the second magnet 2 in a state having been driven to the third position (e.g. the state shown in FIG. 7B), and FIG. 4B is a cross-sectional view, taken on line B-B in FIG. 2, of the second magnet 2 in a state having been driven to the fourth position (e.g. the state shown in FIG. 7D).

When the second outer magnetic pole parts 7d and 7e of the stator 7 are N magnetized and the second rotor 9 and the second inner magnetic pole part of the first rotor 8 are S magnetized, by energizing the second coil 4 in the state shown in FIG. 4A, the second magnet 2 is rotated clockwise to reach the state shown in FIG. 4B, in which the second magnet 2 abuts a stopper, not shown, to stop. As the second magnet 2 is rotated, the output pin 10b of the second output member 10 is rotated along with the second magnet 2, whereby the shutter blades 13 and 14 interlocked to the output pin 10b are also rotated.

In the state shown in FIG. 4B, if the second outer magnetic pole parts 7d and 7e of the stator 7 are S magnetized and the second rotor 9 and the second inner magnetic pole part of the first rotor 8 are N magnetized by energizing the second coil 4 in the opposite direction to that of the energization in the state shown in FIG. 4A, the second magnet 2 is rotated counterclockwise to reach the state shown in FIG. 4A, in which the second magnet 2 abuts a stopper, not shown, to stop.

As is apparent from the above description, the second magnet 2 can be driven between the third and fourth positions through a predetermined rotational angle by switching the direction of energization of the second coil 4.

With the arrangement described above, magnetic flux generated by energization of the first coil 3 forms the magnetic circuit extending from the top plate 7a through the first outer magnetic pole parts 7b and 7c to the first inner magnetic pole part 8a, so that leakage of magnetic flux into the second outer magnetic pole parts 7d and 7e and the second inner magnetic pole part, which causes an increase in magnetic resistance, can be almost reduced to zero. Thus, the energization of the first coil 3 only drives the first magnet 1 without adversely affecting the second magnet 2.

Similarly, magnetic flux generated by energization of the second coil 4 forms the magnetic circuit extending from the top plate 7a through the second outer magnetic pole parts 7d and 7e to the second inner magnetic pole part, so that leakage of magnetic flux into the first outer magnetic pole parts 7b and 7c and the first inner magnetic pole part 8a, which causes an increase in magnetic resistance, can be almost reduced to zero. Thus, the energization of the second coil 4 only drives the second magnet 2 without adversely affecting the first magnet 1.

As is apparent from the above description, the rotations of the two magnets 1 and 2 can be controlled as desired by switching the two coils 3 and 4 for energization, as desired, which makes it possible to produce two outputs separately.

If two driving devices as disclosed in Japanese Laid-Open Patent Publication (Kokai) No. 2002-49076, referred to hereinbefore, are combined back-to-back, the combined devices extend over a doubled axial length, and the number of component parts is also doubled. Further, one of the two output pins extends from one end of the combined devices, and the other extends from the other end of the same. Therefore, it is impossible to have both of the two output parts extended in the same direction as in the present embodiment.

In contrast, in the driving device of the present embodiment, the top plate 7a connecting between the inner magnetic pole part and the outer magnetic pole parts is shared by the first and second stators, which makes it possible to reduce the axial length of the entire driving device. Further, the first outer magnetic pole parts and the second outer magnetic pole parts are integrally formed by bending the former and the latter in opposite directions and in a manner offset from each other in the circumferential direction of the top plate 7a, which contributes to reduction of the number of component parts and manufacturing costs. Furthermore, the first rotor 8 is a rod-like component part extending through the center of the driving device, and functions not only as the first output member but also as the first and second inner magnetic pole parts. Thus, the first rotor 8 has a simple shape and the number of component parts can be reduced, eliminating the necessity to use such a complicated stator as is used in the driving device disclosed in Japanese Laid-Open Patent Publication (Kokai) No. 2002-49076.

Moreover, as is apparent from FIG. 2 showing the driving device of the present embodiment in cross section, most of the component parts are formed of soft magnetic materials and used to form a magnetic circuit, magnetic resistance is reduced so that magnetic flux effectively acts on the magnets 1 and 2. Therefore, the driving device can produce a high output despite its small size.

Next, a description will be given of a second embodiment of the present invention, with reference to FIGS. 8 and 9.

Figure 8:
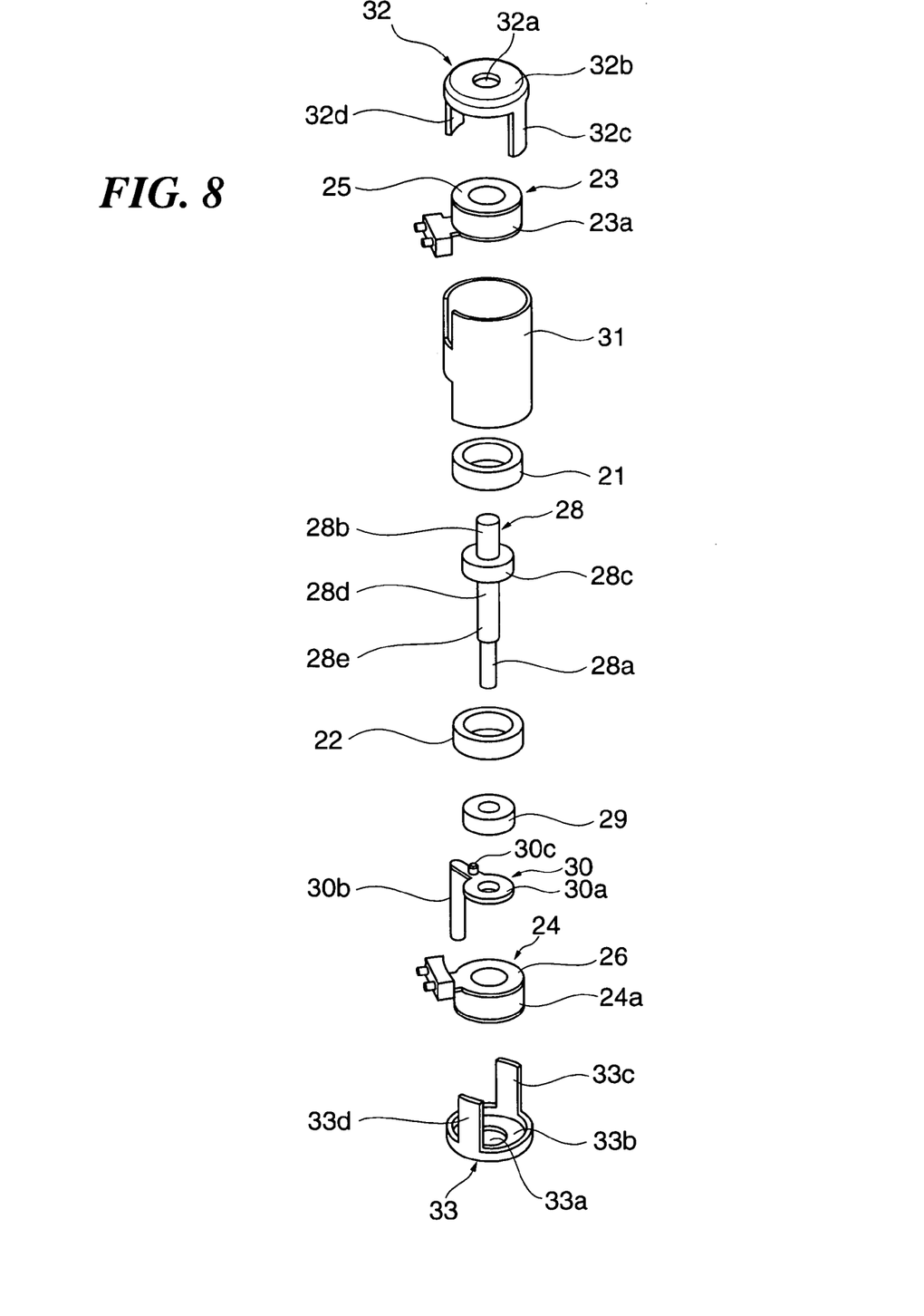
FIG. 8 is an exploded perspective view of a driving device according to a second embodiment of the present invention.
Figure 9:
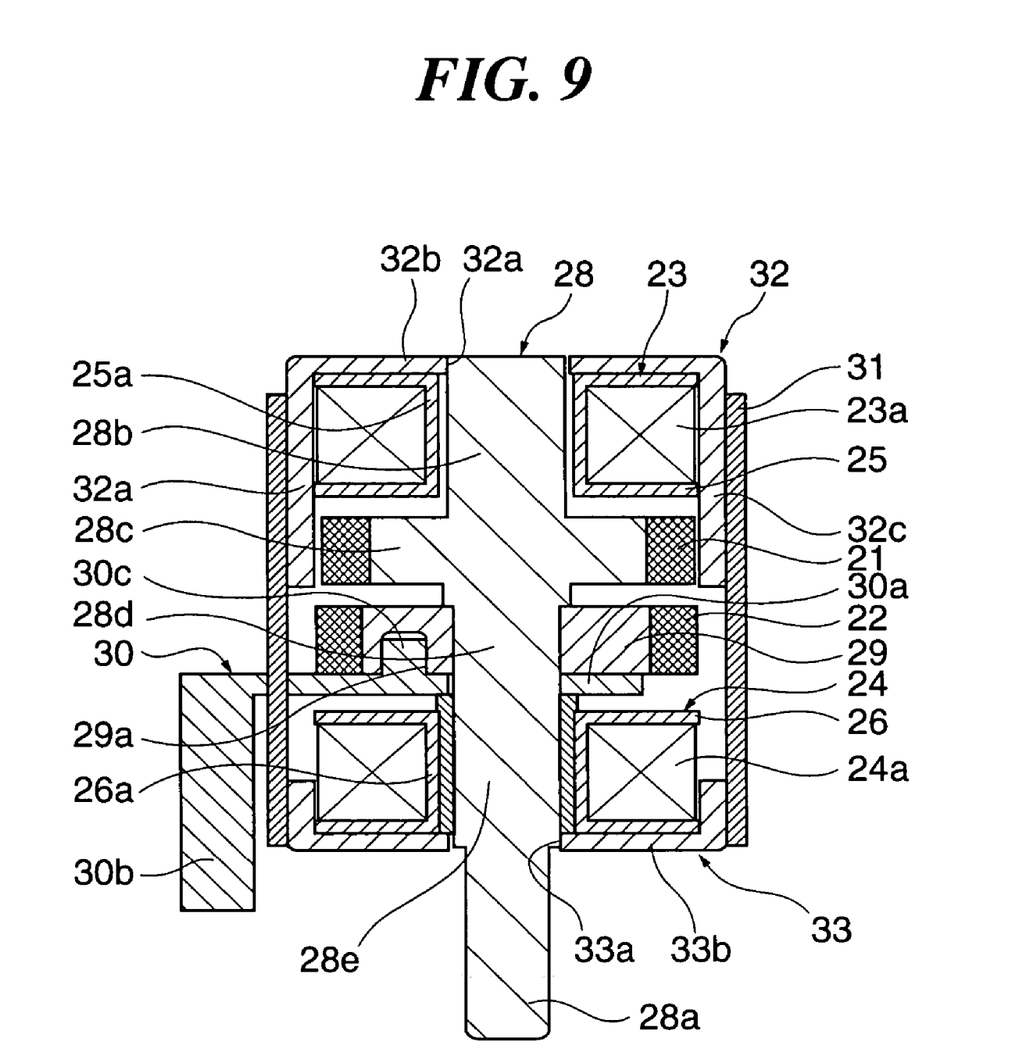
FIG. 9 is an axial cross-sectional view of the driving device in FIG. 8 in an assembled state.

FIG. 8 is an exploded perspective view of a driving device according to the second embodiment, and FIG. 9 is an axial cross-sectional view of the driving device in FIG. 8 in an assembled state.

In FIGS. 8 and 9, reference numeral 21 designates a first magnet in the form of a hollow cylinder having open opposite ends. The first magnet 21 has a peripheral wall thereof circumferentially divided into n sections (four sections in the present embodiment) magnetized such that they have alternately different S and N poles. The first magnet 21 has an inner periphery thereof rigidly fitted on an outer periphery of an increased diameter part 28c of a first rotor 28, described in detail hereinafter, such that the first magnet 21 can rotate in unison with the first rotor 28.

Reference numeral 22 designates a second magnet in the form of a hollow cylinder having open-opposite ends. The second magnet 22 has a peripheral wall thereof circumferentially divided into n sections (four sections in the present embodiment) magnetized such that they have alternately different S and N poles. The second magnet 22 has an inner periphery thereof rigidly fitted on an outer periphery of a second rotor 29, described in detail hereinafter, such that the second magnet 22 can rotate in unison with the second rotor 29.

Reference numeral 23 designates a first coil in the form of a hollow cylinder. The first coil 23 is formed by winding wire 23a around an annular groove 25a of a hollow cylindrical first bobbin 25 formed of an insulating material. The first coil 23 is disposed coaxial with and adjacent the first magnet 21 and extends axially of the first magnet 21 on a side opposite to the second magnet 22 with respect to the first magnet 21. The outer diameter of the first coil 23 is approximately equal to that of the first magnet 21.

Reference numeral 24 designates a second coil in the form of a hollow cylinder. The second coil 24 is formed by winding wire 24a around an annular groove 26a of a hollow cylindrical second bobbin 26 formed of an insulating material. The second coil 24 is disposed coaxial with and adjacent the second magnet 22 and extends axially of the second magnet 22 on a side opposite to the first magnet 21 with respect to the second magnet 22. The outer diameter of the second coil 24 is approximately equal to that of the second magnet 22.

Reference numeral 32 designates a first stator formed of a soft magnetic material. The first stator 32 has a circular top plate 32b formed with a hole 32a in its center and protruding parts 32c and 32d axially extending from the outer peripheral edge of the top plate 32b. The protruding parts 32c and 32d are opposed to the outer peripheral surface of the first magnet 21 with a predetermined clearance therebetween. The protruding parts 32c and 32d, which function as outer magnetic pole parts, are circumferentially offset from each other by 720/n degrees (180 degrees in the present embodiment). When the first coil 23 is energized, the first outer magnetic pole parts 32c and 32d are magnetized to act on the first magnet 21 together with a first inner magnetic pole part, described in detail hereinafter.

Reference numeral 33 designates a second stator formed of a soft magnetic material. The second stator 33 has a circular top plate 33b formed with a hole 33a in its center and protruding parts 33c and 33d axially extending from the outer peripheral edge of the top plate 33b. The protruding parts 33c and 33d are opposed to the outer peripheral surface of the second magnet 22 with a predetermined clearance therebetween. The protruding parts 33c and 33d, which function as outer magnetic pole parts, are circumferentially offset from each other by 720/n degrees (180 degrees in the present embodiment). When the second coil 24 is energized, the second outer magnetic pole parts 33c and 33d are magnetized to act on the second magnet 22 together with a second inner magnetic pole part, described in detail hereinafter.

The second rotor 29, which is formed of a soft magnetic material, is rigidly fitted in the inner periphery of the second magnet 22. The second rotor 29 performs angular reciprocation along with angular reciprocation of the second magnet 22. Further, the second rotor 29 is rotatably fitted on a cylindrical part 28d, described in detail hereinbelow, of the first rotor 28. The second rotor 29 is magnetized together with the cylindrical part 28d of the first rotor 28 and a cylindrical part 28e, referred to hereinafter, of the same, to act on the second magnet 22 as the second inner magnetic pole part.

The rod-like first rotor 28, which is formed of a soft magnetic material, has a first output part (first output member) 28a on a front end side (lower end side as viewed in FIGS. 8 and 9) thereof. Further, the first rotor 28 has a cylindrical part 28b on a base end side (upper end side as viewed in FIGS. 8 and 9) thereof, and the increased diameter part 28c lies between the cylindrical part 28b and the first output part 28a. The increased diameter part 28c of the first rotor 28 is rigidly fitted in the inner periphery of the first magnet 21. The first rotor 28 performs angular reciprocation along with angular reciprocation of the first magnet 21 to drive the light amount control blade 15 similarly to the first embodiment, e.g. as described hereinabove with reference to FIGS. 5A to 7D.

Further, the cylindrical part 28b of the first rotor 28 is inserted in the inner periphery of the first coil 23. When the first coil 23 is energized, the cylindrical part 28b and the increased diameter part 28c are magnetized. The increased diameter part 28c of the first rotor 28 is opposed to the first outer magnetic pole parts 32c and 32d of the first stator 32 which is opposed to the first magnet 21, such that it sandwiches the first magnet 21 between the same and the first outer magnetic pole parts 32c and 32d, and forms the first inner magnetic pole part. The first inner magnetic pole part 28c is magnetized by the first coil 23 such that it has an opposite pole to the pole of the first outer magnetic pole parts 32c and 32d. As a result, a magnetic circuit is formed by the first outer magnetic pole parts 32c and 32d, the top plate 32b, and the first inner magnetic pole part. The distance between the first outer magnetic pole parts 32c and 32d and the first inner magnetic pole part is controlled only by the thickness of the first magnet 21 and a gap between the first magnet 21 and the first outer magnetic pole parts 32c and 32d, which gap is set to a small value that prevents contact between these parts, so that the distance can be set to a required minimum value, which makes it possible to reduce the resistance of the magnetic circuit and cause magnetic flux to effectively act-on the first magnet 21 sandwiched between the first outer magnetic pole parts 32c and 32d and the first inner magnetic pole part.

The cylindrical parts 28d and 28e of the first rotor 28 between the increased diameter part 28c and the first output part 28a are inserted in the inner periphery of the second magnet 22 and the inner periphery of the second coil 24, respectively, and when the second coil 24 is energized, the cylindrical parts 28d and 28e are magnetized. Further, since the cylindrical part 28d is in contact with the second rotor 29, magnetic flux flows into the cylindrical part 28d. As a result, the second inner magnetic pole part is formed by the cylindrical parts 28d and 28e and the second rotor 29, whereby the magnetic flux acts on the second magnet 22.

The second inner magnetic pole part (cylindrical parts 28d and 28e and second rotor 29) is magnetized by the second coil 24 such that it has an opposite pole to the pole of the second outer magnetic pole parts 33c and 33d of the second stator 33. As a result, a magnetic circuit is formed by the second outer magnetic pole parts 33c and 33d, the top plate 33b, and the second inner magnetic pole part. The distance between the second outer magnetic pole parts 33c and 33d and the second inner magnetic pole part is controlled only by the thickness of the second magnet 22 and a gap between the second magnet 22 and the second outer magnetic pole parts 33c and 33d, which gap is set to a small value that prevents contact between these parts, so that the distance can be set to a required minimum value, which makes it possible to reduce the resistance of the magnetic circuit and cause magnetic flux to effectively act on the second magnet 22 sandwiched between the second outer magnetic pole parts 33c and 33d and the second inner magnetic pole part.

The first rotor 28 is rigidly fitted in the first magnet 21, and acts not only as the inner magnetic pole part for rotation in unison with the first magnet 21, but also as the second inner magnetic pole part.

Reference numeral 30 designates a second output member for driving the shutter blades 13 and 14 similarly to the first embodiment, e.g. as described hereinabove with reference to FIGS. 5A to 7D. The second output member 30 is comprised of a ring-shaped member 30a, an output pin 30b axially extending from the outer peripheral edge of the ring-shaped member 30a, and an engaging pin 30c axially extending from the upper surface of the ring-shaped member 30a in the opposite direction to the direction in which the output pin 30b extends. The central opening of the ring-shaped member 30a is fitted on the cylindrical part 28d of the first rotor 28, and the engaging pin 30c is fitted in an engaging hole 29a in the second rotor 29, whereby the second output member 30 is fixedly attached to the lower surface of the second rotor 29 for angular reciprocation in unison with the second rotor 29 through a predetermined rotational angle. Further, the second output member 30 drives the shutter blades 13 and 14, by the axially extending output pin 30b.

The second output member 30 may be formed integrally with the second magnet 22 or the second rotor 29.

Reference numeral 31 designates a cover in the form of a hollow cylinder having open opposite ends, which covers the driving device at the entire circumferential side thereof and holds the first stator 32 and the second stator 33 in coaxially with each other.

As is distinct from the driving device of the first embodiment in which the first output part 8e side end thereof is fully exposed, in the present embodiment, the driving device has opposite axial ends thereof both covered by the top plate 32b of the first stator 32 and the top plate 33b of the second stator 33, respectively. Therefore, it suffices to cover the circumferential side of the driving device to protect the driving device from external influence of dust and the like.

The operation of the driving device of the present embodiment is the same as that of the driving device of the first embodiment, and therefore description thereof is omitted.

The driving device of the present embodiment has the opposite axial ends thereof covered, respectively, by the top plate 32b of the first stator 32 and the top plate 33b of the second stator 33, as described above, so that it is unnecessary to provide special cover members to cover the opposite axial ends of the driving device.

In the first embodiment, the top plate 7a of the stator 7 functioning as a magnetic path passes not only magnetic flux generated by the first coil 3, but also magnetic flux generated by the second coil 4.

On the other hand, in the second embodiment, a magnetic path for passing magnetic flux generated by the first coil 23 and a magnetic path for passing magnetic flux generated by the second coil 24 are completely separated from each other. Therefore, disturbance of magnetic flux is prevented, and each flow of magnetic flux effectively acts on a corresponding one of the magnets 21 and 22.

Further, in the first embodiment in which the first stator and the second stator ate integrally formed as the stator 7, the first outer magnetic pole parts and the second outer magnetic pole parts should be axially bent from the top plate 7a by press working such that the first outer magnetic pole parts and the second outer magnetic pole parts are disposed at respective circumferential locations which do not overlap each other.

In contrast, in the second embodiment, since the first stator 32 and the second stator 33 are independent of each other, the number of protruding parts (i.e. the number of magnetic poles of each magnet) and the shape thereof are not limited, and therefore the shape of the outer magnetic pole parts can be configured as desired.

In the first embodiment, in which the first stator and the second stator are integrally formed as the stator 7, and the magnetic path for passing magnetic flux generated by the first coil 3 and the magnetic path for passing magnetic flux generated by the second coil 4 are commonly provided by the top plate 7a of the stator 7, the axial length of the driving device can be reduced, but the driving device has one axial end thereof open (i.e. the first magnet 1 side end portion is exposed), which necessitates covering the open end by the cover 11. The axial length, including the thickness of the cover 11, of the driving device of the first embodiment is substantially equal to that of the driving device of the second embodiment, and therefore the driving device of the second embodiment which is configured to have the first and second stators 32 and 33 as separate members is hardly disadvantageous in respect of the axial length thereof.

It should be noted that the present invention is not limited to the above-described embodiments, but can be modified in various manners based on the subject matter of the present invention, which should not be excluded from the scope of the present invention.

What is claimed is:

1. A driving device comprising:
    a hollow cylindrical first magnet having a peripheral wall thereof circumferentially divided into sections magnetized to have alternately different poles, said first magnet having an outer peripheral surface and an inner periphery;
    a first coil disposed coaxial with and adjacent said first magnet and extending axially of said first magnet;
    a first stator having a magnetic pole part opposed to the outer peripheral surface of said first magnet, the magnetic pole part of said first stator being magnetized by said first coil;
    a first rotor rigidly fitted in the inner periphery of said first magnet, said first rotor being magnetized by said first coil;
    a first output member disposed to be driven to a first position or a second position by rotation of said first magnet;
    a hollow cylindrical second magnet disposed concentric with said first magnet and having a peripheral wall thereof circumferentially divided into sections magnetized to have alternately different poles, said second magnet having an outer peripheral surface and an inner periphery;
    a second coil disposed coaxial with and adjacent said second magnet and extending axially of said second magnet, said second coil having an inner periphery;
    a second stator having a magnetic pole part opposed to the outer peripheral surface of said second magnet, the magnetic pole part of said second stator being magnetized by said second coil;
    a second rotor rigidly fitted in the inner periphery of said second magnet, said second rotor having an inner periphery; and
    a second output member disposed to be driven to a third position or a fourth position by rotation of said second magnet,
    wherein said first rotor has a portion thereof inserted in the inner periphery of said second coil and the inner periphery of said second rotor, said portion being magnetized by said second coil.

2. A driving device as claimed in claim 1, wherein said first rotor and said second rotor are both formed of a soft magnetic material.

3. A driving device as claimed in claim 1, comprising a top plate sandwiched between said first coil and said second coil, said top plate having an outer peripheral edge, and wherein:

said first magnet, said first coil, said second coil, and said second magnet are arranged coaxial with each other in an order mentioned;

said first stator comprises at least one protruding piece-like magnetic pole part axially extending from the outer peripheral edge of said top plate toward said first magnet; and said second stator comprises at least one protruding piece-like magnetic pole part axially extending from the outer peripheral edge of said top plate toward said second magnet.

4. A driving device as claimed in claim 1, comprising a first top plate covering a surface of said first coil opposite to a surface thereof opposed to said first magnet, said first top plate having an outer peripheral edge, and a second top plate covering a surface of said second coil opposite to a surface thereof opposed to said second magnet, said second top plate having an outer peripheral edge, and
wherein:

said first coil, said first magnet, said second magnet, and said second coil are arranged coaxial with each other in an order mentioned;

said first stator comprises at least one protruding piece-like magnetic pole part axially extending from the outer peripheral edge of the first top plate toward said first magnet; and said second stator comprises at least one protruding piece-like magnetic pole part axially extending from the outer peripheral edge of the second top plate toward said second magnet.

5. A light amount controller comprising:

a base plate having an opening;

shutter blades for opening and closing the opening of said base plate;

a light amount control member for controlling an amount of light passing through the opening of said base plate; and a driving device held on said base plate, for driving said shutter blades and said light amount control member, wherein:

said driving device comprises a hollow cylindrical first magnet having a peripheral wall thereof circumferentially divided into sections magnetized to have alternately different poles, said first magnet having an outer peripheral surface and an inner periphery, a first coil disposed coaxial with and adjacent said first magnet and extending axially of said first magnet, a first stator having a magnetic pole part opposed to the outer peripheral surface of said first magnet, the magnetic pole part of said first stator being magnetized by said first coil, a first rotor rigidly fitted in the inner periphery of said first magnet, said first rotor being magnetized by said first coil, a first output member disposed to be driven to a first position or a second position by rotation of said first magnet, a hollow cylindrical second magnet disposed coaxial with said first magnet and having a peripheral wall thereof circumferentially divided into sections magnetized to have alternately different poles, said second magnet having an outer peripheral surface and an inner periphery, a second coil disposed coaxial with said second magnet and extending axially of said second magnet, said second coil having an inner periphery, a second stator having a magnetic pole part opposed to the outer peripheral surface of said second magnet, the magnetic pole part of said second stator being magnetized by said second coil, a second rotor rigidly fitted in the inner periphery of said second magnet, said second rotor having an inner periphery, and a second output member disposed to be driven to a third position or a fourth position by rotation of said second magnet;

said first rotor of said driving device has a portion thereof inserted in the inner periphery of said second coil and the inner periphery of said second rotor, said portion being magnetized by said second coil;

said first output member drives said light amount control member; and said second output member drives said shutter blades.

* * * * *